United States Patent
Yamane

(10) Patent No.: US 10,978,745 B2
(45) Date of Patent: Apr. 13, 2021

(54) SECONDARY BATTERY AND BATTERY PACK

(71) Applicant: Toyota Jidosha Kabushiki Kaisha, Toyota (JP)

(72) Inventor: Shingo Yamane, Chiryu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 103 days.

(21) Appl. No.: 16/270,881

(22) Filed: Feb. 8, 2019

(65) Prior Publication Data

US 2019/0252731 A1 Aug. 15, 2019

(30) Foreign Application Priority Data

Feb. 9, 2018 (JP) .............................. JP2018-021952

(51) Int. Cl.
*H01M 4/00* (2006.01)
*H01M 10/0587* (2010.01)
*H01M 4/131* (2010.01)
*H01M 10/0525* (2010.01)

(52) U.S. Cl.
CPC ........ *H01M 10/0587* (2013.01); *H01M 4/131* (2013.01); *H01M 10/0525* (2013.01); *H01M 2220/20* (2013.01)

(58) Field of Classification Search
CPC ......... H01M 10/0587; H01M 10/0585; H01M 10/0525; H01M 10/052; H01M 4/131; H01M 4/1315; H01M 4/13; H01M 2220/20
See application file for complete search history.

(56) References Cited

U.S. PATENT DOCUMENTS

| 2011/0052975 | A1 | 3/2011 | Lee |
| 2011/0236750 | A1 | 9/2011 | Kohno et al. |
| 2016/0126586 | A1 | 5/2016 | Kobayashi |
| 2016/0204393 | A1* | 7/2016 | Harayama ............. H01G 11/74 429/94 |
| 2016/0336548 | A1 | 11/2016 | Kobayashi et al. |

FOREIGN PATENT DOCUMENTS

| JP | 2011198663 A | 10/2011 |
| JP | 2015-041589 A | 3/2015 |
| JP | 2016091787 A | 5/2016 |
| JP | 2016219143 A | 12/2016 |
| JP | 2017147116 A | 8/2017 |
| KR | 20110025036 A | 3/2011 |
| WO | 2015025209 A1 | 2/2015 |

* cited by examiner

*Primary Examiner* — Raymond Alejandro
(74) *Attorney, Agent, or Firm* — Dinsmore & Shohl LLP

(57) ABSTRACT

A secondary battery includes a flat wound electrode body; a battery case that accommodates the wound electrode body; and an insulating film. The wound electrode body has a first radius section opposing a top surface of the battery case, a second radius section opposing a bottom surface of the battery case, and a flat portion flanked by the first radius section and the second radius section. The insulating film is disposed between a flat surface of the flat portion of the wound electrode body and the battery case, and between a curved surface of the second radius section of the wound electrode body and the battery case. The insulating film has one groove at a portion opposing the curved surface of the second radius section and positioned between two planes resulting from extending two flat surfaces of the wound electrode body.

8 Claims, 12 Drawing Sheets

SECONDARY BATTERY AND BATTERY PACK

CROSS-REFERENCE TO RELATED APPLICATIONS

The present application claims priority to Japanese Patent Application No. 2018-021952 filed on Feb. 9, 2018, the entire contents of which are incorporated into the present specification by reference.

BACKGROUND

1. Technical Field

The present disclosure relates to a secondary battery. More particularly, the present disclosure relates to a secondary battery that is used while restrained. The present disclosure relates also to a battery pack.

2. Description of the Related Art

In recent years, secondary batteries such as lithium ion secondary batteries have come to be suitably used as portable power sources in personal computers, mobile terminals and the like, and as power sources for vehicle drive in electric vehicles (EV), hybrid vehicles (HV) and plug-in hybrid vehicles (PHV).

Secondary batteries such as lithium ion secondary batteries have typically a configuration wherein an electrode body provided with a positive electrode and a negative electrode is accommodated in a battery case. It is a well-known feature to arrange an insulating film between the electrode body and the battery case, in order to insulate the foregoing from each other (see for instance Japanese Patent Application Publication No. 2016-91787, Japanese Patent Application Publication No. 2017-147116, Japanese Patent Application Publication No. 2016-219143 and Japanese Patent Application Publication No. 2011-198663). To arrange the insulating film, the electrode body is wrapped with a bag-shaped insulating film, and thereafter the whole is inserted into the battery case.

When the bag-shaped insulating film is of square type, as disclosed in Japanese Patent Application Publication No. 2016-219143 and Japanese Patent Application Publication No. 2011-198663, the insulating film is prone to colliding with the top end portion of the battery case during an insertion operation. The corners of the bottom of the battery case are often rounded, and thus the corners of the square-type bag-shaped insulating film collide against the rounded corners of bottom of the battery case during an insertion operation. In order to prevent such a collision, the distance between the bottom of the battery case and the insulating film must be increased, which translates into a dead space. If the electrode body is a wound electrode body, therefore, it is a well-known feature, aimed at solving the above problem, to impart rounding to the bottom portion of the bag-shaped insulating film so as to match the shape of a radius section of a lower end of the wound electrode body, as disclosed in Japanese Patent Application Publication No. 2016-91787 and Japanese Patent Application Publication No. 2017-147116.

SUMMARY

In cases where the secondary battery is used in an application such as a power source for vehicle drive, the secondary battery is used in the form of a battery pack in which a plurality of secondary batteries is arrayed in a predetermined direction and is restrained. The plurality of secondary batteries in the battery pack is restrained so that a load is applied in the array direction. Accordingly, the insulating film becomes sandwiched between a flat portion of the wound electrode body and the battery case on account of the restraining load applied from the side faces of the battery case, and the portions of the insulating film in contact with the flat portion of the wound electrode body become fixed as a result.

The wound electrode body expands and contracts for instance on account of charging/discharging and thermal load. In the battery pack, a restraining load is applied on the wound electrode body, and accordingly the wound electrode body expands mainly in a direction perpendicular to the thickness direction thereof, being the direction in which the load is applied. Therefore, the electrode body expands so that the radius section at the lower end of the wound electrode body bulges out. Tensile stress acts on the bottom portion of the insulating film during expansion of the wound electrode body such that the radius section at the lower end of the wound electrode body bulges out. This tensile stress can be relieved by virtue of the fact that the insulating film can extend and contract. In the battery pack, however, the portions of the insulating film in contact with the flat portion of the wound electrode body are fixed in the manner described above, and accordingly the region over which the insulating film can extend is small, and tensile stress is not relieved readily. Upon repeated expansion and contraction of the wound electrode body, therefore, tensile stress repeatedly acts on the bottom portion of the insulating film, and deterioration of the insulating film is accelerated as a result, which is problematic.

A separating space can be conceivably provided between the lower end of the wound electrode body and the bottom portion of the insulating film, in such a manner that no tensile stress acts on the insulating film. This space is a dead space and entails a drop in battery capacity. Further, that space might hinder the return, to the wound electrode body, of electrolyte solution released from the wound electrode body.

Particular problems arise thus when the secondary battery is used while restrained, for instance as a battery pack.

It is therefore an object of the present disclosure to relieve tensile stress acting on the insulating film on account of expansion of the wound electrode body, without providing an excessively large space between the lower end of the wound electrode body and the insulating film, in a secondary battery that is used while restrained.

The secondary battery disclosed herein is provided with: a flat wound electrode body; a battery case that accommodates the wound electrode body; and an insulating film that insulates the wound electrode body and the battery case from each other. The secondary battery is used while restrained. The wound electrode body has a first radius section opposing a top surface of the battery case, a second radius section opposing a bottom surface of the battery case, and a flat portion flanked by the first radius section and the second radius section. The insulating film is disposed at least between a flat surface of the flat portion of the wound electrode body and the battery case, and between a curved surface of the second radius section of the wound electrode body and the battery case. The insulating film has at least one groove at a portion opposing the curved surface of the second radius section. The at least one groove is positioned between two planes resulting from extending two flat surfaces of the wound electrode body.

In such a configuration, the insulating film is bent along groove, and the length of the insulating film is greater than the perimeter of the radius section at the lower end of the wound electrode body, at a portion opposing the curved surface of the radius section at the lower end of the wound electrode body. Therefore, expansion of the wound electrode body such that the radius section of the lower end bulges out can be absorbed over that length, and tensile stress can be relieved as a result. In addition, the grooves are positioned between two planes resulting from extending the two flat surfaces of the wound electrode body, and in consequence the bottom of the insulating film can take on a shape close to the shape of the radius section at the lower end of the wound electrode body. Accordingly, an excessively large space can be prevented from forming between the lower end of the wound electrode body and the insulating film. By virtue of the above configuration, it becomes possible to relieve tensile stress acting on the insulating film on account of expansion of the wound electrode body, without providing an excessively large space between the lower end of the wound electrode body and the insulating film, in a secondary battery that is used while restrained.

In some embodiments of the secondary battery disclosed herein, the insulating film has two or three grooves between the two planes resulting from extending the two flat surfaces of the wound electrode body, at a portion opposing the curved surface of the second radius section.

Such a configuration affords a superior balance between productivity and suppression of dead space.

In some embodiments of the secondary battery disclosed herein, the insulating film has the groove on a surface thereof opposing the battery case.

Such a configuration translates into excellent formability of the insulating film.

A battery pack disclosed herein is a battery pack having a plurality of the above secondary batteries. In the above battery pack, the plurality of secondary batteries is arrayed in a predetermined direction; and the plurality of secondary batteries is restrained so that a load is applied in the array direction.

By virtue of the above configuration, it becomes possible to relieve tensile stress acting on the insulating film on account of expansion of the wound electrode body, without providing an excessively large space between the lower end of the wound electrode body and the insulating film, in secondary batteries that make up a battery pack.

DESCRIPTION OF THE EMBODIMENTS

Figure 1:
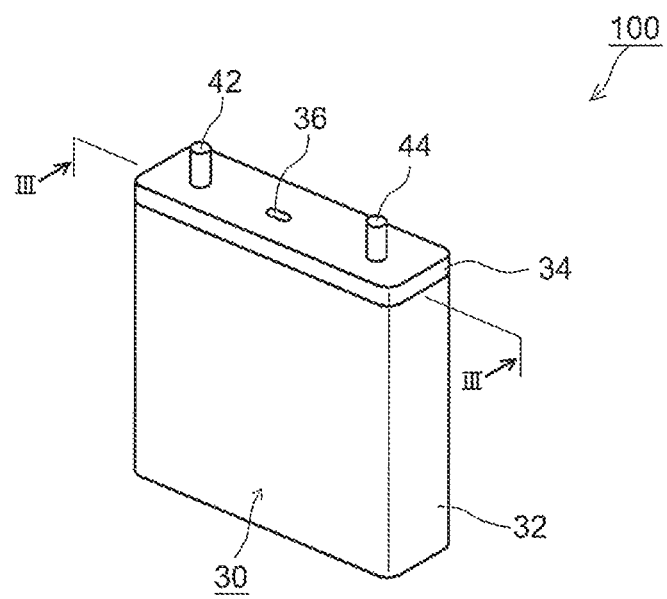
FIG. 1 is a perspective-view diagram illustrating schematically the outer shape of a secondary battery according to an embodiment of the present disclosure.

Embodiments of the present disclosure will be explained below with reference to accompanying drawings. Any features other than the matter specifically set forth in the present specification and that may be necessary for carrying out the present disclosure (for instance, the ordinary configuration and production process of a secondary battery and a battery pack, not being characterizing features of the present disclosure) can be regarded as instances of design matter, for a person skilled in the art, based on known techniques in the relevant technical field. The present disclosure can be realized on the basis of the disclosure of the present specification and common technical knowledge in the relevant technical field. In the drawings below, members and portions that elicit identical effects are denoted with identical reference symbols. The dimensional relationships (length, width, thickness and so forth) in the figures do not reflect actual dimensional relationships.

In the present specification, the term "secondary battery" denotes an electric storage device in general that is capable of being charged and discharged repeatedly, and encompasses so-called storage batteries such as lithium ion secondary batteries and electric storage elements such as electrical double layer capacitors. The present disclosure will be explained in detail next on the basis, by way of example, of a flat square-type lithium ion secondary battery. The present disclosure is not meant to be limited to the features described in the embodiments.

Figure 2:
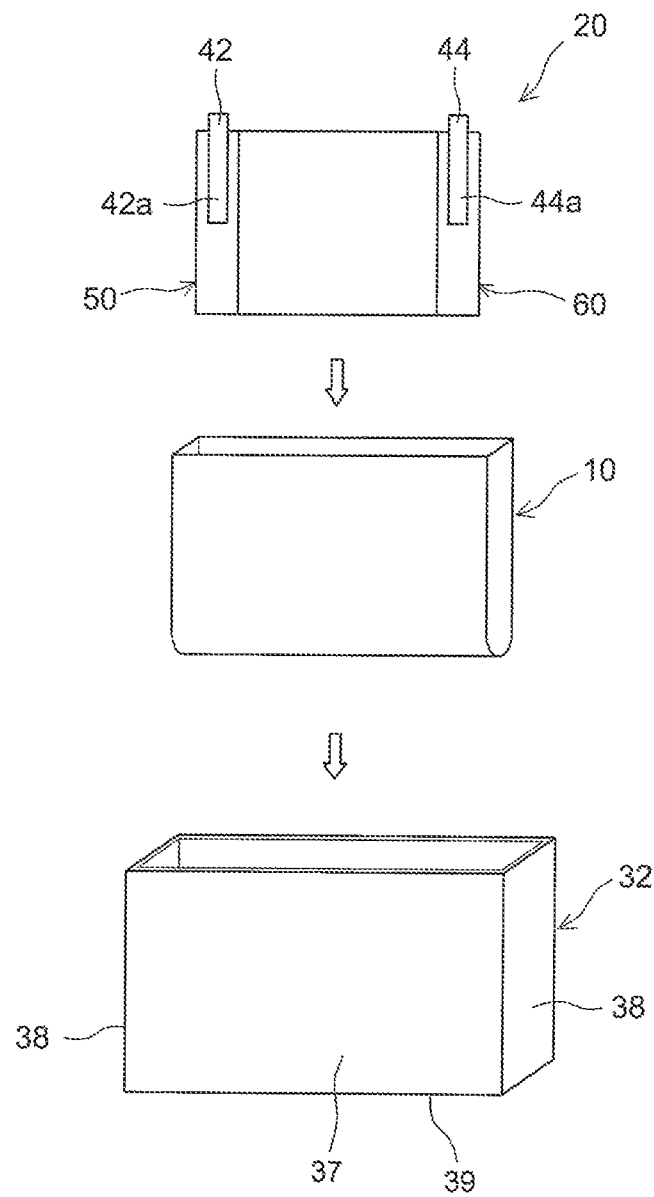
FIG. 2 is an exploded perspective-view diagram illustrating schematically the configuration of a secondary battery according to an embodiment of the present disclosure.
Figure 3:
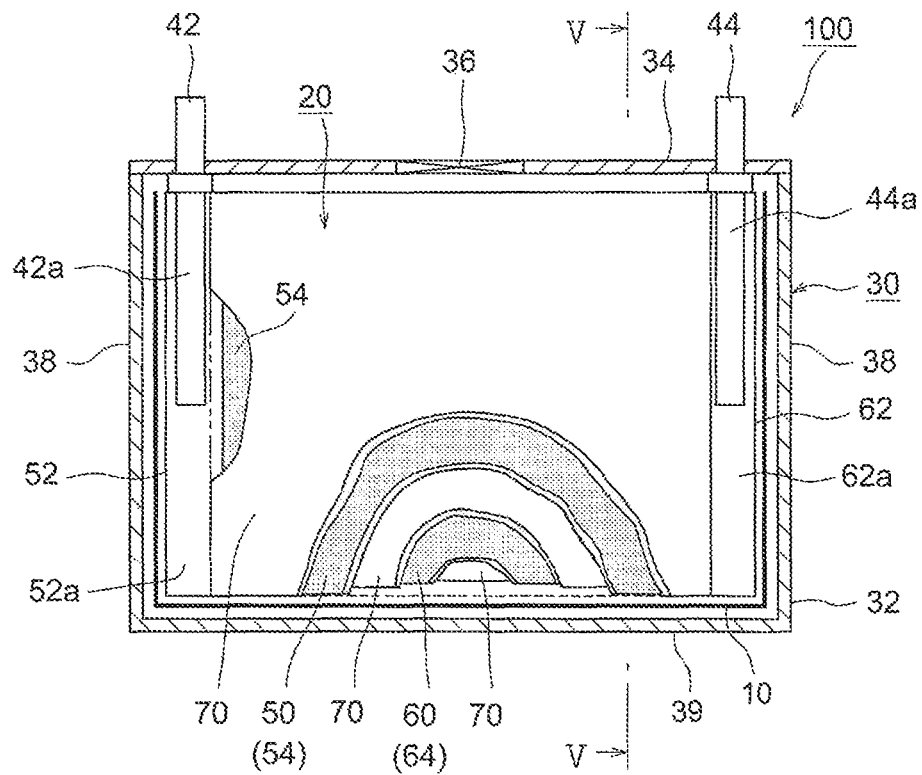
FIG. 3 is a longitudinal cross-sectional diagram illustrating schematically the cross-sectional structure of FIG. 1 along line III-III.
Figure 4:
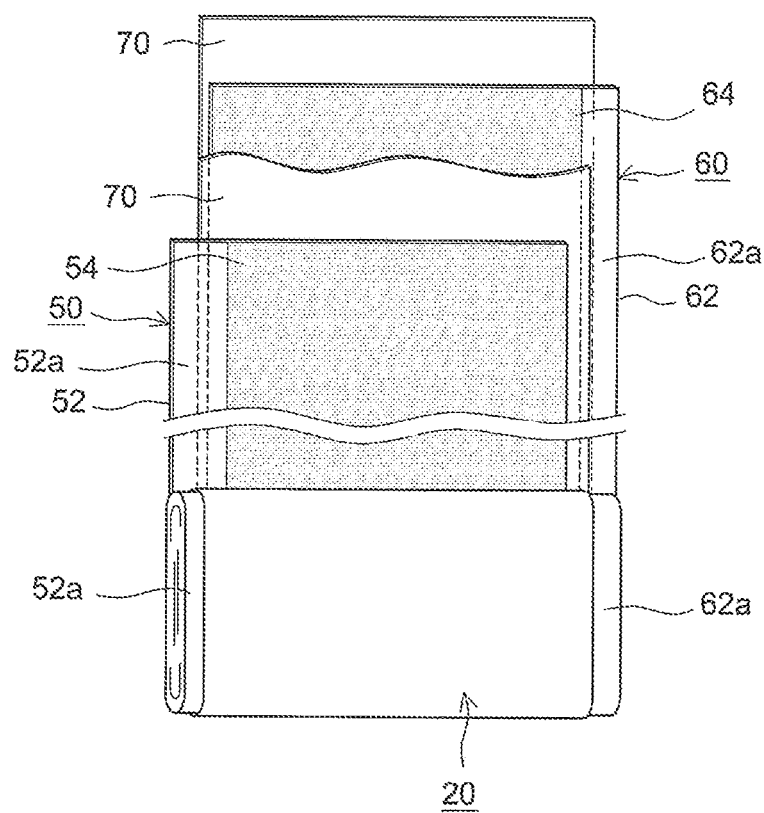
FIG. 4 is a schematic diagram illustrating the configuration of a wound electrode body of a secondary battery according to an embodiment of the present disclosure.

FIG. 1 is a perspective-view diagram illustrating schematically the outer shape of a nonaqueous electrolyte secondary battery according to an embodiment. FIG. 2 is an exploded perspective-view diagram illustrating schematically the configuration of a nonaqueous electrolyte secondary battery according to an embodiment. FIG. 3 is a longitudinal cross-sectional diagram illustrating schematically the cross-sectional structure of FIG. 1 along line III-III. FIG. 4 is a schematic diagram illustrating the configuration of a wound electrode body according to an embodiment.

A lithium ion secondary battery 100 illustrated in FIG. 1 to FIG. 3 is a sealed-type battery provided with a flat wound electrode body 20, a nonaqueous electrolyte solution (not shown), a battery case 30 that accommodates the wound electrode body 20, and an insulating film 10 that insulates the wound electrode body 20 and the battery case 30 from each other.

As illustrated in FIG. 1 to FIG. 3, the battery case 30 is provided with a case body 32 and a lid body 34. The case body 32 has a bottomed rectangular parallelepiped shape having an opening at the top surface. The lid body 34 is a member that plugs the opening of the case body 32. The case body 32 has dimensions allowing the wound electrode body 20 to be accommodated in the inner space of the case body 32. As illustrated in FIG. 2, the case body 32 can accommodate the wound electrode body 20 and the insulating film 10 via the opening of the case body 32. As illustrated in FIG. 1 to FIG. 3, the case body 32 is made up of a pair of wide surfaces 37 opposing flat surfaces (flat portion) of the wound electrode body 20 that is accommodated inside the case, a pair of narrow surfaces 38 adjacent to the wide surfaces 37, and a bottom surface 39. The lid body 34 constitutes the top surface of the battery case 30. A metallic member that is lightweight and has good thermal conductivity, for instance aluminum, is used as the material of the battery case 30. The terms "top surface" and "bottom surface" apply herein to the ordinary state of use of the lithium ion secondary battery 100.

As illustrated in FIG. 1 to FIG. 3, a positive electrode terminal 42 for external connection and a negative electrode terminal 44 for external connection are attached to the battery case 30. In the battery case 30 there is provided a thin-walled safety valve 36 set so as to relieve internal pressure in the battery case 30 when the internal pressure thereof rises to or above a predetermined level. An injection port (not shown) for injection of a nonaqueous electrolyte is provided in the battery case 30. The positive electrode terminal 42 is electrically connected to the positive electrode collector plate 42a. The negative electrode terminal 44 is electrically connected to the negative electrode collector plate 44a.

As illustrated in FIG. 2 to FIG. 4, the wound electrode body 20 is of a form that results from laminating a positive electrode sheet 50 in which a positive electrode active material layer 54 is formed along the longitudinal direction on one or both faces (herein both faces) of an elongated positive electrode collector 52, and a negative electrode sheet 60 in which a negative electrode active material layer 64 is formed along the longitudinal direction on one or both faces (herein both faces) of an elongated negative electrode collector 62, with two elongated separator sheets 70 interposed therebetween, and winding then the resulting laminate in the longitudinal direction. The positive electrode collector plate 42a and the negative electrode collector plate 44a are respectively joined to a positive electrode active material layer non-formation section 52a (i.e. exposed portion of the positive electrode collector 52 at which the positive electrode active material layer 54 is not formed) and a negative electrode active material layer non-formation section 62a (i.e. exposed portion of the negative electrode collector 62 at which the negative electrode active material layer 64 is not formed) that are formed so as to protrude outward from both edges of the wound electrode body 20 in the winding axis direction thereof (i.e. sheet width direction perpendicular to the longitudinal direction).

Sheets similar to those used in conventional lithium ion secondary batteries can be utilized, without particular limitations, in the positive electrode sheet 50 and the negative electrode sheet 60. One typical implementation is described below.

Examples of the positive electrode collector 52 that makes up the positive electrode sheet 50 include for instance aluminum foil. Examples of the positive electrode active material contained in the positive electrode active material layer 54 include for instance lithium-transition metal oxides (for example $LiNi_{1/3}Co_{1/3}Mn_{1/3}O_2$, $LiNiO_2$, $LiCoO_2$, $LiFeO_2$, $LiMn_2O_4$ and $LiNi_{0.5}Mn_{1.5}O_4$), and lithium-transition metal phosphate compounds (for example $LiFePO_4$). The positive electrode active material layer 54 can contain components other than the active material, for instance a conductive material and a binder. As the conductive material there can be suitably used for instance carbon black such as acetylene black (AB) or other carbon materials (for example graphite). For instance polyvinylidene fluoride (PVDF) can be used as the binder.

For instance a copper foil can be used as the negative electrode collector 62 that makes up the negative electrode sheet 60. A carbon material such as graphite, hard carbon or soft carbon can be used as the negative electrode active material contained in the negative electrode active material layer 64. The negative electrode active material layer 64 can contain components other than the active material, for instance a binder and a thickener. Styrene butadiene rubber (SBR) or the like can be used as the binder. For instance carboxymethyl cellulose (CMC) can be used as the thickener.

Examples of the separators 70 include porous sheets (films) made up of a resin such as polyethylene (PE), polypropylene (PP), polyester, cellulose or polyamide. The porous sheet may be a single-layer structure or a multilayer structure of two or more layers (for instance a three-layer structure in which a PP layer is laid up on both faces of a PE layer). The separators 70 may be provided with a heat-resistant layer (HRL).

An electrolyte solution the same as or similar to those of conventional lithium ion secondary batteries can be used as the nonaqueous electrolyte solution. A solution can be typically used that contains a supporting salt in an organic solvent (nonaqueous solvent). As the nonaqueous solvent there can be used, without particular limitations, various types of organic solvent, for instance carbonates, ethers, esters, nitriles, sulfones and lactones that are utilized in electrolyte solutions of ordinary lithium ion secondary batteries. Concrete examples include for instance ethylene carbonate (EC), propylene carbonate (PC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC) and trifluorodimethyl carbonate (TFDMC). Such nonaqueous solvents can be used singly or in combinations of two or more types, as appropriate. For instance a lithium salt such as $LiPF_6$, $LiBF_4$ or $LiClO_4$ (desirably $LiPF_6$) can be used as the supporting salt. The concentration of the supporting salt is desirably 0.7 mol/L to 1.3 mol/L.

So long as the effect of the present disclosure is not significantly impaired thereby, the above nonaqueous electrolyte solution can contain various additives, for instance gas generating agents such as biphenyl (BP) or cyclohexyl benzene (CHB), film-forming agents such as oxalato complex compounds containing boron atoms and/or phosphorus atoms, or vinylene carbonate (VC), as well as dispersants and thickeners.

Figure 5A:
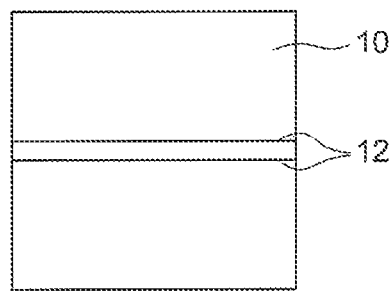
FIG. 5A is a partial developed-view diagram of an insulating film used in an embodiment of the present disclosure.
Figure 5B:
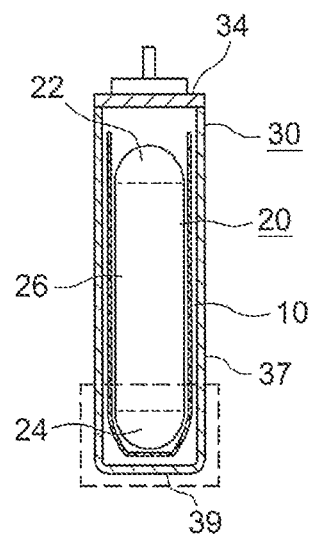
FIG. 5B is a longitudinal cross-sectional diagram illustrating schematically a cross-sectional structure along line V-V in FIG. 3.
Figure 5C:
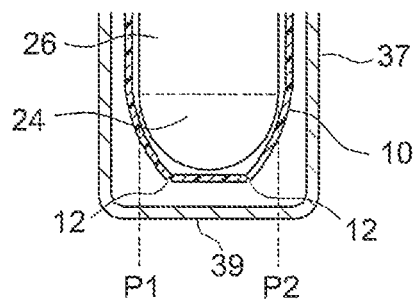
FIG. 5C is an enlarged-view diagram of the interior of the frame in FIG. 5B.

The insulating film 10 used in the present embodiment will be explained next in detail. FIG. 5A is a partial developed-view diagram of the insulating film used in the present embodiment. FIG. 5B is a longitudinal cross-sectional diagram illustrating schematically a cross-sectional structure along line V-V in FIG. 3. FIG. 5C is an enlarged-view diagram of the interior of the frame in FIG. 5B.

As illustrated in FIG. 5B, the insulating film 10 is disposed between the wound electrode body 20 and the battery case 30, and insulates the wound electrode body 20 and the battery case 30 from each other.

The material of the insulating film 10 is not particularly limited, so long as the material can function as an insulating member. Examples thereof include for instance resin materials such as polypropylene (PP) and polyethylene (PE). The insulating film 10 may be of single layer structure or of multilayer structure.

The average thickness of the insulating film 10 may be set as appropriate in accordance with the configuration of the lithium ion secondary battery 100. When the average thickness of the insulating film 10 is small, the space taken up by the insulating film 10 in the battery case 30 can be kept to a minimum, which is advantageous in terms of battery capacity. When the average thickness of the insulating film 10 is excessively small, however, the durability of the insulating film 10 may decrease. Therefore, the average thickness of the insulating film 10 is desirably not less than 20 μm and not more than 200 μm, more desirably not less than 50 μm and not more than 100 μm.

As illustrated in FIG. 5B, the wound electrode body 20 has a first radius section 22 opposing the top surface the battery case 30 (in other words, the lid body 34), a second radius section 24 that opposes the bottom surface 39 of the battery case 30, and a flat portion 26 flanked by the first radius section 22 and the second radius section 24. The first radius section 22 and the second radius section 24 are respective portions having a curved surface (in other words, a curved outer surface), of the wound electrode body 20. The flat portion 26 is a portion having two flat surfaces (in other words, flat main surfaces) of the wound electrode body 20. In FIG. 5B, the insulating film 10 is illustrated in a state of being disposed between the flat portion 26 of the wound electrode body 20 and the battery case 30, and between the second radius section 24 of the wound electrode body 20 and the battery case 30.

As illustrated in FIG. 2, FIG. 3 and FIG. 5B, the insulating film 10 has a bottomed bag shape with an opening at the top end. The insulating film 10 can accommodate the wound electrode body 20 in the interior, so as to surround the wound electrode body 20. The shape of the insulating film 10 is not particularly limited, so long as the insulating film 10 is disposed at least between the flat surfaces of the flat portion 26 of the wound electrode body 20 and the battery case 30, and between the curved surface of the second radius section 24 of the wound electrode body 20 and the battery case 30. Therefore, the insulating film 10 need not be shaped in the form of a bag. For instance, the insulating film 10 may be sheet-shaped, and the sheet-shaped insulating film 10 may be embodied so that the film is disposed between the flat surfaces of the flat portion 26 of the wound electrode body 20 and the battery case 30 and between the curved surface of the second radius section 24 of the wound electrode body 20 and the battery case 30.

FIG. 5A is a diagram illustrating the development of portions, of the insulating film 10, opposing the wide surfaces 37 of the battery case 30 and of a portion opposing the bottom surface 39 of the battery case 30. FIG. 5B illustrates a cross-section of these portions of the insulating film 10. As illustrated in FIG. 5A, the insulating film 10 has two grooves 12. As illustrated in FIG. 5C, the two grooves 12 are provided at a portion, of the insulating film 10, opposing the curved surface of the second radius section 24 of the wound electrode body 20. A plane P1 results from extending a first flat surface of the wound electrode body 20 and plane P2 results from extending a second flat surface of the wound electrode body 20. As illustrated in FIG. 5C, the two grooves 12 are positioned at positions between the plane P1 and plane P2 being extensions of the two flat surfaces of the wound electrode body 20.

In the present specification, the expressions "grooves are positioned between two planes" and "grooves are positioned between a plane and a plane" do not include an instance where "a groove is positioned on a plane".

By providing thus the grooves 12 in the insulating film 10, it becomes possible to relieve the tensile stress generated in the insulating film 10 due to expansion of the wound electrode body 20, without providing an excessively large space between the lower end of the wound electrode body 20 and the insulating film 10. Underlying reasons for this are as follows.

Figure 6:
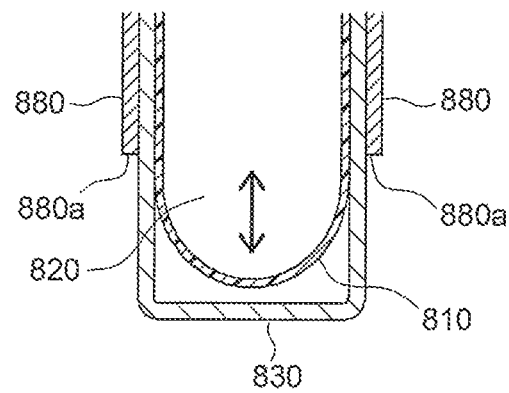
FIG. 6 is a schematic cross-sectional diagram of a bottom portion of a conventional lithium ion secondary battery used while restrained.
Figure 7:
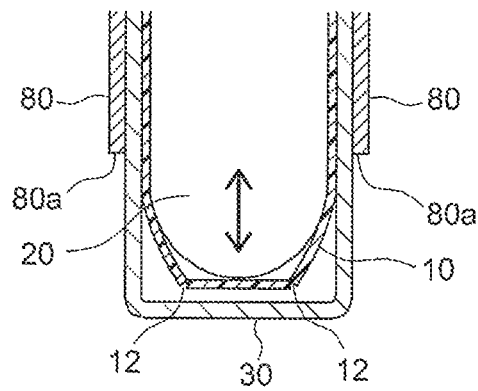
FIG. 7 is a schematic cross-sectional diagram of a bottom portion of a lithium ion secondary battery according to an embodiment of the present disclosure, used while restrained.

FIG. 6 illustrates a schematic cross-sectional diagram of a bottom portion of a conventional lithium ion secondary battery used while restrained. FIG. 7 illustrates a schematic cross-sectional diagram of a bottom portion of a lithium ion secondary battery according to the present embodiment, used while restrained.

As illustrated in FIG. 6, the conventional lithium ion secondary battery has a wound electrode body 820 accommodated in a battery case 830. An insulating film 810 is disposed between the wound electrode body 820 and the battery case 830, and insulates the wound electrode body 820 and the battery case 830 from each other. The insulating film 810 has a shape conforming to the shape of the wound electrode body 820. Accordingly, the bottom of the insulating film 810 has a curved shape along a radius section at the lower end of the wound electrode body 820. A pair of restraining plates 880 is respectively disposed at a pair of side faces (wide surfaces) of the battery case 830. A restraining load is applied in the thickness direction (in other words, the electrode stacking direction) of the wound electrode body 820, so as to pinch the battery case 830.

The wound electrode body 820 expands and contracts on account for instance of charging/discharging and thermal load during use of the battery. The restraining plates 880 apply a restraining load on the wound electrode body 820, which expands or contracts as a result in the directions of the arrows in FIG. 6. The wound electrode body 820 expands in consequence in a manner that the radius section at the lower end of the wound electrode body 820 bulges out. As a result, tensile stress acts on the bottom portion of the insulating film 810 upon expansion of the wound electrode body 820. This tensile stress can be relieved by virtue of the fact that the insulating film 810 can extend and contract. However, a restraining load is applied on the wound electrode body 820 by the restraining plates 880, and hence elongation of the insulating film 810 takes place only at a portion downward of the lower end portions 880a of the restraining plates 880, without extension of the insulating film 810 at the region at which the restraining load is applied on the insulating film 810. Accordingly, the region at which the insulating film 810 can extend is small, and in consequence tensile stress is not readily relieved. Upon repeated expansion and contraction of the wound electrode body 820, therefore, tensile stress is repeatedly exerted on the insulating film 810, with the vicinity of the lower end portions 880a of the restraining plates 880 as a reference point, and deterioration of the insulating film 810 is accelerated as a result. Breakage of the insulating film 810 can occur in the vicinity of the lower end portions 880a of the restraining plates 880 as such deterioration progresses.

Grooves 12 are provided, in the above form, in the insulating film 10 of the lithium ion secondary battery 100 according to the present embodiment. As illustrated in FIG. 7, in a case where the lithium ion secondary battery 100 according to the present embodiment is used while restrained, the region at which the insulating film 10 can extend is only a portion downward of the lower end portions 80a of the restraining plate 80, similarly to the conventional technology illustrated in FIG. 6. Herein grooves 12 are provided in the insulating film 10, which as a result bends along the grooves 12. Accordingly, the length of the insulating film 10 is greater than the perimeter of the radius section at the lower end of the wound electrode body 20, at a section from the lower end portion 80a of the one restraining plate 80 up to the lower end portion 80a of the other restraining plate 80. Therefore, expansion of the wound electrode body 20 such that the radius section at the lower end bulges out can be absorbed over that length, and tensile stress can be relieved as a result. It becomes therefore possible to suppress deterioration of the insulating film 10, such as that derived from tensile stress repeatedly acting on the insulating film 10.

Moreover, the grooves 12 are positioned between the plane P1 (see FIG. 5A to FIG. 5C) and plane P2 (see FIG. 5A to FIG. 5C) resulting from extending the two flat surfaces of the wound electrode body 20, and in consequence the bottom of the insulating film 10 can take on a shape close to the shape of the radius section at the lower end of the wound electrode body 20. Therefore, an excessively large space can be prevented from forming between the lower end of the wound electrode body 20 and the insulating film 10. It becomes accordingly possible to prevent that the electrolyte solution released from the wound electrode body 20 should return with difficulty to the wound electrode body 20. Drops in battery capacity derived from the formation of a dead space can also be suppressed. Such drops in battery capacity caused by the formation of a dead space can be more effectively suppressed, in particular, in a case where the lower end of the wound electrode body 20 and the insulating film 10 are brought into contact with each other, as illustrated in FIG. 5A to FIG. 5C. The shape of the bottom of the insulating film 10 is close to the shape of the radius section at the lower end of the wound electrode body 20, and accordingly a benefit is achieved in that the insulating film 10 does not hit readily against the top end portion of the battery case 30 or the corners of the bottom portion of the battery case 30 during insertion of the wound electrode body 20, wrapped in the insulating film 10, into the battery case 30.

Figure 8:
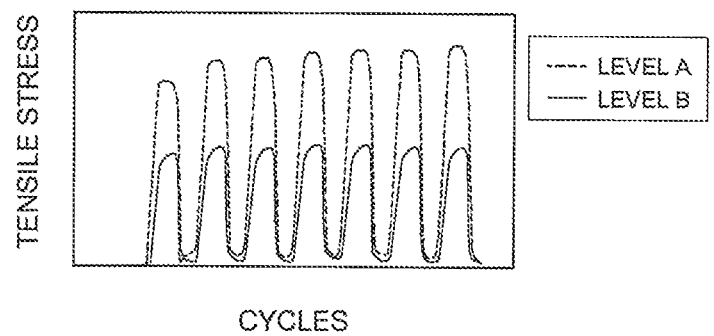
FIG. 8 is a graph illustrating study results on dummy batteries of level A and level B.

Results of studies by the inventors will be explained next. The inventors prepared and studied two dummy batteries, of levels A and B. In the dummy batteries of level A and level B, a wound electrode body surrounded by a bag-shaped insulating film was accommodated in a battery case. In the present study, there was not used any nonaqueous electrolyte solution. In level A, no grooves were provided in the insulating film, as in the form illustrated in FIG. 6 (i.e. corresponding to conventional art), and the shape of the bottom portion of the insulating film was matched to the radius section at the lower end of the wound electrode body. In level B, by contrast, two grooves were provided in the insulating film, as in the form illustrated in FIG. 5A to FIG. 5C. The depth of the grooves was set to a dimension of 60% of the thickness of the insulating film. A strain gauge was attached to each insulating film of the dummy batteries of level A and level B. The dummy batteries of level A and level B were restrained with a pair of restraining plates, in such a manner that pressure was applied onto the flat portion of the wound electrode body. The position of the strain gauge was set to be close to the lower end of the restraining plates. A heat shock test was performed between 0° C. and 60° C., and then tensile stress was measured. FIG. 8 illustrates the measurement results. As FIG. 8 reveals, the battery of level B, in which grooves were provided in the insulating film, exhibited smaller tensile stress than that of level A, in which no grooves were provided in the insulating film. It was accordingly found that tensile stress can be relieved by providing grooves in the insulating film, as in the present embodiment.

Figure 9A:
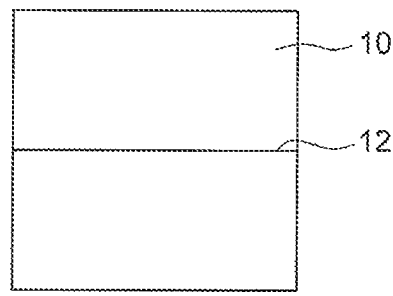
FIG. 9A is a partial developed-view diagram of an insulating film used in a first variation of an embodiment of the present disclosure.
Figure 9B:
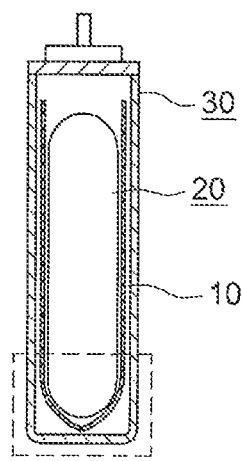
FIG. 9B is a longitudinal cross-sectional diagram illustrating schematically the cross-sectional structure of a battery in a first variation.
Figure 9C:
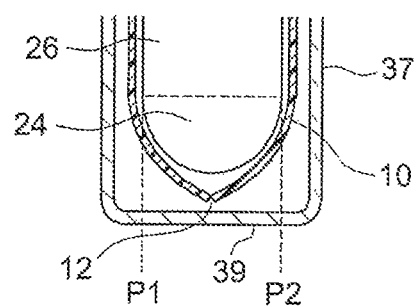
FIG. 9C is an enlarged-view diagram of the interior of the frame in FIG. 9B.

A variation of the lithium ion secondary battery 100 according to the present embodiment will be explained next. FIG. 9A is a partial developed-view diagram of an insulating film used in a first variation of the lithium ion secondary battery 100 of the present embodiment. FIG. 9B is a longitudinal cross-sectional diagram illustrating schematically the cross-sectional structure of the battery of the first variation. FIG. 9C is an enlarged-view diagram of the interior of the frame of FIG. 9B. FIG. 9A to FIG. 9C correspond respectively to FIG. 5A to FIG. 5C. As illustrated in the figures, the battery differs from the lithium ion secondary battery 100 described above in that one groove 12 is provided in the insulating film 10 of the battery of the first variation. As illustrated in FIG. 9C, the one groove 12 is positioned at a position between the plane P1 and plane P2 resulting from extending the two flat surfaces of the wound electrode body 20.

Also in a case where the grooves 12 provided in the insulating film 10 is one groove, the insulating film 10 is bent along that groove 12, as illustrated in the figures, and as a result the length of the insulating film 10 is greater than the perimeter of the second radius section 24 of the lower end of the wound electrode body 20 at the portion at which the insulating film 10 opposes the second radius section 24 of the lower end of the wound electrode body 20. Therefore, expansion of the wound electrode body 20 such that the radius section 24 of the lower end bulges out can be absorbed over that length, and tensile stress can be relieved as a result. It becomes accordingly possible to suppress deterioration of the insulating film 10, such as that derived from tensile stress repeatedly acting on the insulating film 10.

Figure 10A:
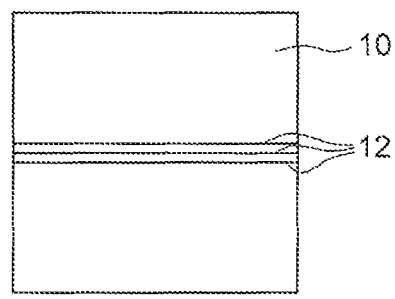
FIG. 10A is a partial developed-view diagram of an insulating film used in a second variation of an embodiment of the present disclosure.
Figure 10B:
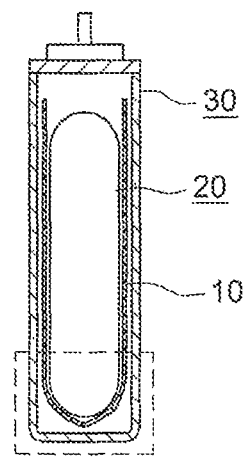
FIG. 10B is a longitudinal cross-sectional diagram illustrating schematically the cross-sectional structure of a battery in a second variation.
Figure 10C:
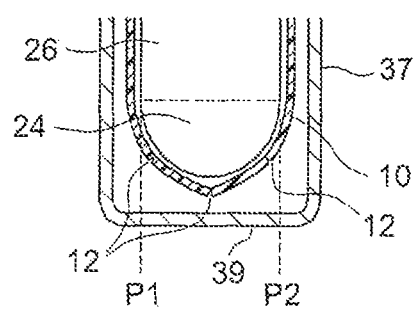
FIG. 10C is an enlarged-view diagram of the interior of the frame in FIG. 10B.

A variation of the lithium ion secondary battery 100 according to the present embodiment will be explained next. FIG. 10A is a partial developed-view diagram of an insulating film used in a second variation of the lithium ion secondary battery 100 of the present embodiment. FIG. 10B is a longitudinal cross-sectional diagram illustrating schematically the cross-sectional structure of the battery of the second variation. FIG. 10C is an enlarged-view diagram of the interior of the frame of FIG. 10B. FIG. 10A to FIG. 10C correspond respectively to FIG. 5A to FIG. 5C. As illustrated in the figures, the battery differs from the lithium ion secondary battery 100 described above in that in the battery of the second variation three grooves 12 are provided in the insulating film 10.

Also in a case where the grooves 12 provided in the insulating film 10 are three grooves, the insulating film 10 is bent along those grooves 12, as illustrated in the figures, and as a result the length of the insulating film 10 is greater than the perimeter of the second radius section 24 of the lower end of the wound electrode body 20 at the portion at which the insulating film 10 opposes the second radius section 24 of the lower end of the wound electrode body 20. Therefore, expansion of the wound electrode body 20 such that the radius section 24 at the lower end bulges out can be absorbed over that length, and tensile stress can be relieved as a result. It becomes accordingly possible to suppress deterioration of the insulating film 10, such as that derived from tensile stress repeatedly acting on the insulating film 10.

In the first variation where the grooves 12 provided in the insulating film 10 are one groove, the lower end portion of the insulating film 10 bulges out towards the bottom surface 39 of the battery case 30, as illustrated in FIG. 9C. Likewise in the second variation where the grooves 12 provided in the insulating film 10 are three grooves, the lower end portion of the insulating film 10 bulges out towards the bottom surface 39 of the battery case 30, as illustrated in FIG. 10C. However, it will be understood that the extent by which the lower end portion of the insulating film 10 bulges out is smaller in the second variation, where the number of grooves 12 is larger. The degree of bulging of the insulating film 10 decreases thus with increasing number of grooves 12 of the insulating film 10. Accordingly, the number of grooves 12 provided in the insulating film 10 is desirably large. On the other hand, productivity may drop when the number of grooves 12 provided in the insulating film 10 is excessive. Therefore, the number of grooves 12 provided in the insulating film 10 is desirably small. From the viewpoint of striking a balance between productivity and suppression of dead space, therefore, the insulating film 10 desirably has two to four grooves, more desirably two or three grooves, between the two planes P1, P2 resulting from extending the two flat surfaces of the wound electrode body 20, at the portion of the insulating film 10 opposing the second radius section 24.

In a case where number of grooves 12 provided in the insulating film 10 is an even number, the lower end of the wound electrode body 20 and the insulating film 10 can be brought into contact, as illustrated in FIG. 6, and as a result it becomes also possible to curtail drops in battery capacity derived from the formation of a dead space. From the viewpoint of suppressing the formation of a dead space, therefore, the insulating film 10 has an even number of grooves 12 (desirably, two or four, more desirably two) between the two planes P1, P2 resulting from extending the two flat surfaces of the wound electrode body 20, at the portion of the insulating film 10 opposing the second radius section 24, and desirably the lower end of the wound electrode body 20 and the insulating film 10 are in contact with each other.

The cross-sectional shape of the grooves 12 is not particularly limited so long as the effect of the present disclosure can be elicited, and may be for example rectangular, V-shaped, U-shaped or semicircular.

The depth of the grooves 12 is not particularly limited so long as the effect of the present disclosure can brought out. The depth of the grooves 12 is desirably 20% or more, and more desirably 35% or more, of the thickness of the insulating film 10, from the viewpoint of facilitating bending of the insulating film 10. On the other hand, the depth of the grooves 12 is desirably 80% or less of the thickness of the insulating film 10, in terms of the strength of the insulating film 10.

Figure 11:
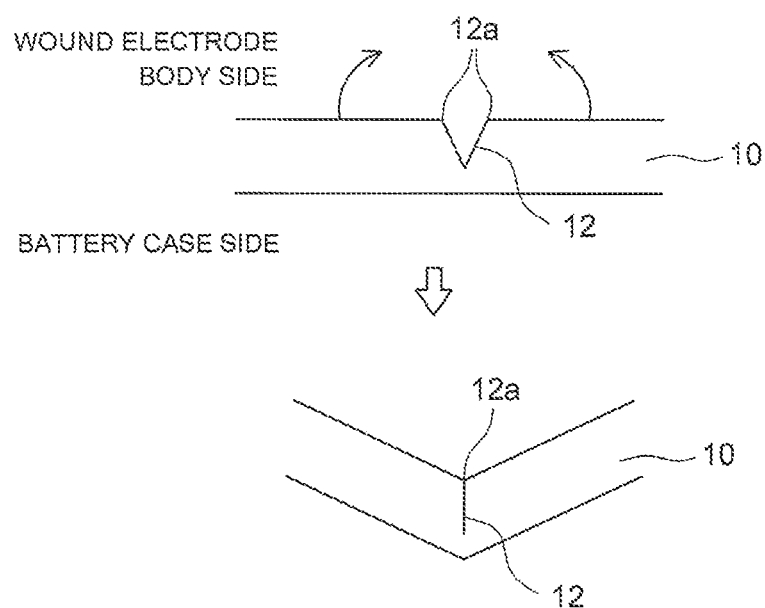
FIG. 11 is a schematic diagram for explaining a bent state at grooves of an insulating film used in an embodiment of the present disclosure.
Figure 12:
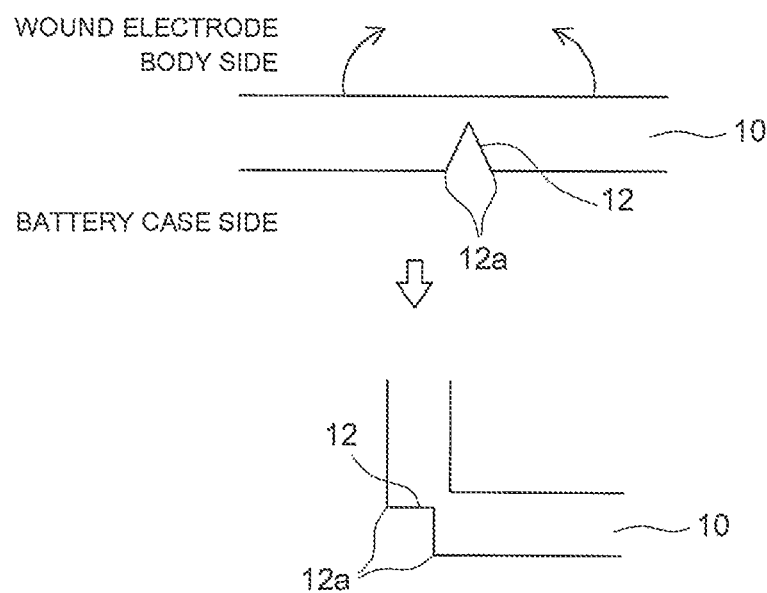
FIG. 12 is a schematic diagram for explaining a bent state at grooves of an insulating film used in an embodiment of the present disclosure.

The grooves 12 may be provided on the surface of the insulating film 10 opposing the wound electrode body 20 and/or on the surface of the insulating film 10 opposing the battery case 30. In a case where the grooves 12 are provided on the surface of the insulating film 10 opposing the wound electrode body 20, however, the ends 12a of the cross-sectional shape of the grooves 12 may interfere with each other, as illustrated in FIG. 11, when the insulating film 10 is bent along the grooves 12. When such interference arises, stress develops so as to revert the insulating film 10 to the original state, and it is difficult to bring the insulating film 10 to the target shape. In a case where by contrast the grooves 12 are provided on the surface of the insulating film 10 opposing the battery case 30, there is no concern of interference between the ends 12a of the cross-sectional shape of the grooves 12 when the insulating film 10 is bent along the grooves 12, as illustrated in FIG. 12. Therefore, the insulating film 10 desirably has the grooves 12 on a surface thereof opposing the battery case 30, from the viewpoint of formability of the insulating film 10.

In the examples illustrated in the figures, the grooves 12 are formed continuously, in a direction running along the lower end of the wound electrode body 20, from a first end towards a second end of the insulating film 10, parallelly to the above direction (the direction along the lower end of the wound electrode body 20 is also parallel to the wide surfaces 37 of the battery case 30, or parallel to the winding axis of the wound electrode body 20). However, the form of the grooves 12 is not limited thereto, so long as the effect of the present disclosure is achieved. FIG. 13A to FIG. 13E are schematic diagrams illustrating various forms of the grooves provided in the insulating film. Similarly to FIG. 5A, FIG. 13A to FIG. 13E are diagrams illustrating the development of a portion, of the insulating film 10, opposing the wide surfaces 37 of the battery case 30, and a portion opposing the bottom surface 39 of the battery case 30. So long as the effect of the present disclosure is achieved, for instance the grooves 12 may be formed intermittently from a first to a second end of the insulating film 10, as illustrated in FIG.

Figure 13A:
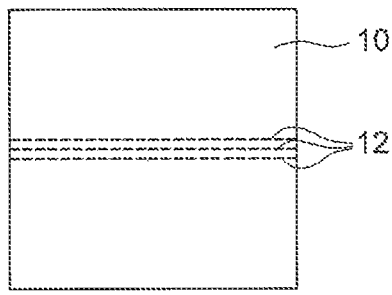
FIG. 13A is a schematic diagram illustrating intermittently formed grooves provided in an insulating film that is used in an embodiment of the present disclosure.
Figure 13D:
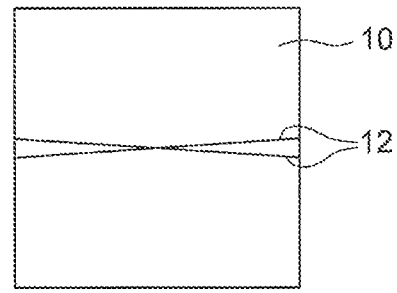
FIG. 13D is a schematic diagram illustrating non-parallel grooves provided in an insulating film that is used in an embodiment of the present disclosure.
Figure 13B:
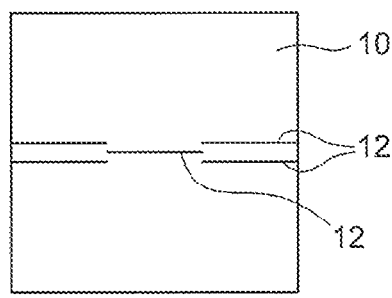
FIG. 13B is a schematic diagram illustrating partially extending grooves provided in an insulating film that is used in an embodiment of the present disclosure.
Figure 13E:
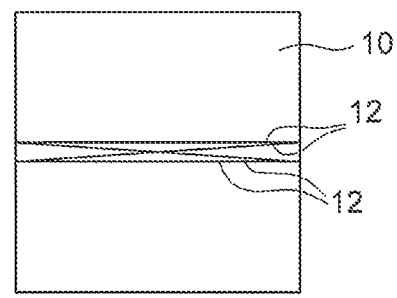
FIG. 13E is another schematic diagram illustrating non-parallel grooves provided in an insulating film that is used in an embodiment of the present disclosure.
Figure 13C:
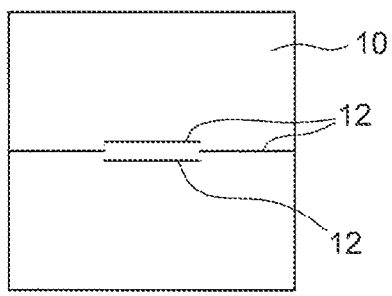
FIG. 13C is another schematic diagram illustrating partially extending grooves provided in an insulating film that is used in an embodiment of the present disclosure.

13A. Provided that the effect of the present disclosure is achieved, for instance the grooves 12 may be provided partially from a first to a second end of the insulating film 10, as illustrated in FIG. 13B and FIG. 13C. For instance the grooves 12 may be not parallel to the direction running along the lower end of the wound electrode body 20, as illustrated in FIG. 13D and FIG. 13E, so long as the effect of the present disclosure is achieved.

The lithium ion secondary battery 100 configured as described above is used while restrained, and can be utilized in various applications. In concrete terms, the lithium ion secondary battery 100 is used while restrained in such a manner that a load is applied onto part or the entirety the flat portion 26 of the wound electrode body 20, being an electrode body reaction portion. The restraining pressure is set as appropriate depending on the relevant application. Multiple lithium ion secondary batteries 100 may be gathered and be restrained collectively. Concrete examples thereof include a battery pack in which a plurality of lithium ion secondary batteries 100 is arrayed in a predetermined direction, the plurality of lithium ion secondary batteries 100 being restrained so that a load is applied in the array direction. The above battery pack can be used particularly suitably as a drive power source in vehicles such as electric vehicles (EV), hybrid vehicles (HV) and plug-in hybrid vehicles (PHV).

Figure 14:
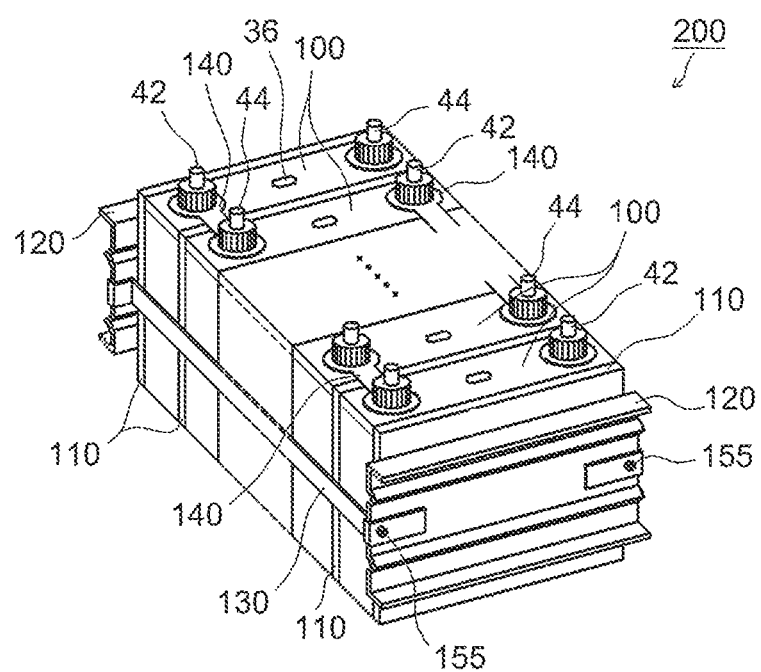
FIG. 14 is a perspective-view diagram illustrating the configuration of a battery pack constructed using secondary batteries according to an embodiment of the present disclosure.

A configuration example of a battery pack will be explained next. FIG. 14 is a perspective-view diagram illustrating the configuration of a battery pack constructed by using the secondary batteries according to the present embodiment.

As illustrated in FIG. 14, a battery pack 200 has a plurality of lithium ion secondary batteries (unit cells) 100 arrayed in a predetermined direction. The unit cells 100 are arrayed while reversed one by one, as a result of which respective positive electrode terminals 42 and negative electrode terminals 44 are disposed alternately. Spacers 110 are sandwiched between the arrayed lithium ion secondary batteries 100. The spacers 110 can function for instance as heat dissipater in order to allow heat to dissipate efficiently, and/or as a length adjuster. The number of unit cells 100 in the battery pack 200 is not particularly limited, and is for instance 10 or more, desirably 10 to 30.

The pair of end plates (restraining plates) 120 is disposed between both ends of the arrayed unit cells 100. Restraining bands 130 for fastening are attached so as to span across the end plates 120. As a result, the unit cells 100 are restrained in such a manner that a predetermined restraining load is applied in the array direction of the unit cells 100. More specifically, the ends of the restraining bands 130 are fastened to the end plates 120 by way of screws 155; as a result, the unit cells 100 become restrained in such a manner that a predetermined restraining load is applied in the array direction of the unit cells 100. Respective spacers 110 are disposed between adjacent unit cells 100, and accordingly not only the portions of the unit cells 100 in contact with the end plates 120 are pressed during restraining, but also the portions of the unit cells 100 in contact with the spacers 110 are pressed during restraining. The flat portions of the wound electrode bodies inside the unit cells 100 are thus pressed wholly. The restraining pressure with which the unit cells 100 are restrained is not particularly limited. For instance the restraining pressure is set in such a manner that the unit cells 100 are pressed, in the array direction, with a pressure equal to or higher than 0.2 MPa (desirably equal to or higher than 0.5 MPa), but equal to or lower than 10 MPa (desirably equal to or lower than 5 MPa).

Respective first positive electrode terminals 42 and second negative electrode terminals 44 are electrically connected, between respective adjacent unit cells 100, by bus bars 140. A battery pack 200 of required voltage is constructed thus through connection in series of the unit cells 100.

Concrete examples of the present disclosure have been explained in detail above, but the examples are merely illustrative in nature, and are not meant to limit the scope of the claims in any way. The features set forth in the claims can accommodate various modifications and alterations of the concrete examples illustrated above.

What is claimed is:

1. A secondary battery, comprising:
   a flat wound electrode body;
   a battery case that accommodates the wound electrode body; and
   an insulating film that insulates the wound electrode body and the battery case from each other, wherein:
   the wound electrode body has a first radius section opposing a top surface of the battery case, a second radius section opposing a bottom surface of the battery case, and a flat portion flanked by the first radius section and the second radius section,
   the insulating film is disposed at least between a flat surface of the flat portion of the wound electrode body and the battery case, and between a curved surface of the second radius section of the wound electrode body and the battery case,
   the insulating film has at least one groove at a portion opposing the curved surface of the second radius section, and
   the at least one groove is positioned between and parallel to two planes resulting from extending two flat surfaces of the wound electrode body.

2. The secondary battery according to claim 1, wherein the insulating film has two or three grooves between the two planes resulting from extending the two flat surfaces of the wound electrode body, at a portion opposing the curved surface of the second radius section.

3. The secondary battery according to claim 1, wherein the insulating film has the groove on a surface thereof opposing the battery case.

4. The secondary battery according to claim 1, wherein the secondary battery is restrained such that a restraining load is applied to the wound electrode body.

5. The secondary battery according to claim 1, wherein the insulating film has an inner surface facing the wound electrode body and an opposite outer surface facing the battery case, and the at least one groove is provided on the outer surface.

6. A battery pack comprising a plurality of secondary batteries, each secondary battery comprising:
   a flat wound electrode body;
   a battery case that accommodates the wound electrode body; and
   an insulating film that insulates the wound electrode body and the battery case from each other, wherein:
   the wound electrode body has a first radius section opposing a top surface of the battery case, a second radius section opposing a bottom surface of the battery case, and a flat portion flanked by the first radius section and the second radius section,
   the insulating film is disposed at least between a flat surface of the flat portion of the wound electrode body and the battery case, and between a curved surface of the second radius section of the wound electrode body and the battery case, the insulating film has at least one groove at a portion opposing the curved surface of the second radius section, the at least one groove is positioned between and parallel to two planes resulting from extending two flat surfaces of the wound electrode body, and the plurality of secondary batteries is arrayed in a predetermined direction, and the plurality of secondary batteries is restrained so that a restraining load is applied in the array direction.

7. The battery pack according to claim 6, wherein the restraining load is applied to the wound electrode body.

8. The battery pack according to claim 6, wherein the insulating film has an inner surface facing the wound electrode body and an opposite outer surface facing the battery case, and the at least one groove is provided on the outer surface.

* * * * *